Feb. 8, 1927.
J. J. REDDICK ET AL
1,617,301
WEIGHING CONVEYER
Filed Dec. 1, 1924
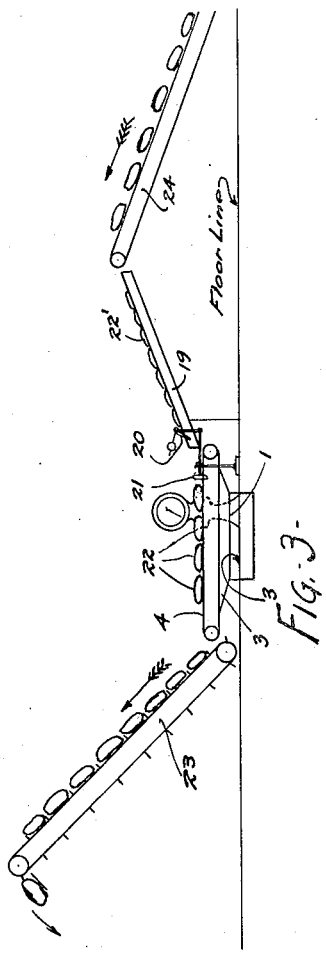
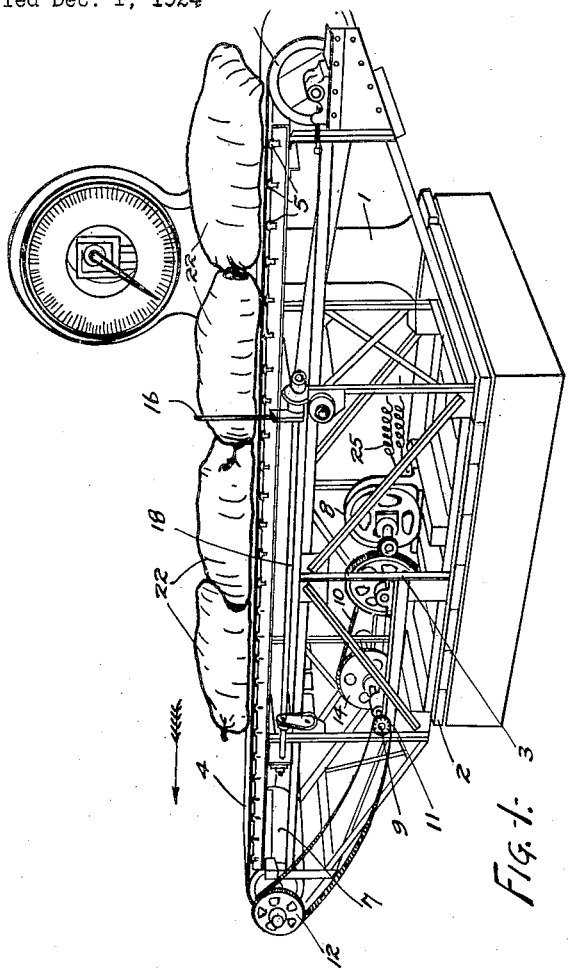
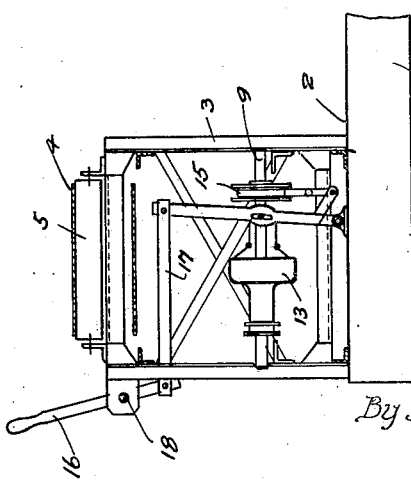
Inventor
John J. Reddick, Deceased,
By Josephine H. Reddick, Administratrix
BY
ATTORNEYS.

Patented Feb. 8, 1927.

1,617,301

UNITED STATES PATENT OFFICE.

JOHN J. REDDICK, DECEASED, LATE OF SAN FRANCISCO, CALIFORNIA; BY JOSEPHINE HANCE REDDICK ADMINISTRATRIX, OF LOS ANGELES, CALIFORNIA.

WEIGHING CONVEYER.

Application filed December 1, 1924. Serial No. 753,385.

This invention relates to means for weighing loads on belt or other conveyers such as used for the transportation of sacks of material, packages, or loose material.

It has for its objects simplified means of obtaining the weight of material thus transported and greater accuracy than the continuous recording devices heretofore used for such purposes.

The objects of this invention are secured through the construction and co-operation of conveying members as shown in the accompanying drawings, in which Figure 1 is a perspective view of the weighing portion of the apparatus mounted on a platform dial scale, and it shows sacks of material on the conveyer.

Figure 2 is an end cross section of Figure 1, drawn to larger scale, and shows the clutch and brake connections.

Figure 3, drawn to smaller scale, shows a side view of a typical weighing conveyer installation in accordance with my invention, showing also the co-operating conveying members for delivering and removing the weighed material.

By detailed reference to the drawings it will be seen in Figure 1 that the apparatus consists of a platform dial scale 1, upon the platform 2 of which is secured a frame 3. This frame supports at 4 a horizontally disposed material conveyer; in this case a flat belt conveyer being shown, tho the apparatus works equally well with any type of material conveyer, the particular type depending merely on the nature of the material being conveyed and weighed.

The belt conveyer 4 is an endless loop carried on idler rolls 5 supported by the frame, and at one end passes over a tail pulley 6 and at the other end over a driving or head pulley 7 in the usual manner of belt conveyer construction.

Under the conveyer and mounted on the frame is a driving motor 8 suitably geared down to a countershaft 9, which in turn is connected by means of a chain 10 passing over sprockets 11 and 12 to the conveyer head pulley 7.

On the countershaft 9 is mounted a friction clutch 13 carrying a sprocket 14 receiving power from the motor gearing.

A band brake drum 15 is also mounted on the countershaft and arranged to co-operate with the clutch (as shown clearer in Figure 2) so that upon the attendant pulling the hand lever 16 the clutch may be thrown out and the brake gradually applied so that the conveyer may be slowed up or stopped entirely if desired, through the manual operation of one lever.

The mechanical connections between the hand lever 16 and the clutch and brake are of no patentable importance, consisting of any suitable arrangement of linkage as shown at 17 (better in Figure 2) operated by the shaft 18 extending to the hand lever 16, and requires no detailed description.

At 19 is shown a loading chute for feeding the conveyer, the loading chute being kept filled with sacks 22′, or other material, from another conveyer 24, or by men in unloading freight cars, etc. The chute has a weighted swinging gate 20 at its lower end, the gate being operated by the attendant through any suitable means, a hand lever 21 being here shown.

At 22 is shown a series of sacks of material upon the belt conveyer as just received from the chute, being weighed and passing toward a receiving conveyer or elevator 23 at the other end of the conveyer. The receiving sack elevator 23 is actuated continuously by a separate drive not shown.

The precise form of the receiving elevator or conveyer is of no importance in relation hereto as it is governed by the nature of the installation, taking any angle from an ascending one to a descending one, or being omitted entirely in some instances when discharging the weighed material directly off the end of the weighing conveyer.

Outline of operation when weighing sacked material:—

The weighing conveyer, also the receiving elevator are set in motion. The attendant trips the chute gate and permits a certain number of sacks, say four, to drop one by one on the traveling belt, glances at the scale dial and checks their total weight on an adding machine while the sacks are in motion, and then trips the gate for four more sacks which are deposited on the belt while the last of the previous batch are being discharged to the elevator.

The number of sacks, or the length of a load of other material, is determined by the attendant so that the weighing conveyer belt will not be completely filled from end to end, but will have an empty portion at the discharge end in order to give the attendant a second or two of time in which to read the weight on the scale before the weighed load begins to discharge.

It has been found in practice that an attendant can weigh about 2,000 sacks an hour with this apparatus, tho if he desires he can slow it down with the brake or stop it if for any reason it should be desirable.

It will be seen that the platform scale carries the whole belt conveyer, frame, motor and gearing, but the weight of this material is compensated for in the scales adjustment so it will register zero when no load is upon the belt. The only parts not wholly carried by the platform are the electric feed wires 25 to the motor, but, as the scale is adjusted to zero with these hanging loosely in place, no error in the reading results.

It may be thought that the drive gearing and motor in operation, also the conveyer, would cause the scale pointer to vibrate too much for accurate reading, but practice shows that with the modern dial "dead beat" type of scale there is no appreciable oscillation of the pointer.

I am aware of other attempts to weigh moving loads on belt conveyers, but do not know of any wherein the entire weight of the apparatus is carried on the scale so that the varying pull of the belt could not influence the weight recorded, or where co-operating means were used in order to get a traveling "interval load" so that an attendant could obtain interval readings.

I therefore claim:—

1. In apparatus of the class described, a supporting frame, a platform scale on the platform on which the said frame is mounted, a horizontally disposed endless conveyer supported on the platform, means for delivering predetermined quantities of material to be weighed to the conveyer, and means to respectively retard and stop motion of the conveyer.

2. In apparatus of the class described, a supporting frame, a platform scale on the platform on which the said frame is mounted, a horizontally disposed endless conveyer supported on the platform, means for delivering predetermined quantities of material to be weighed to the conveyer, and manually operated means to respectively retard and stop motion of the conveyer.

3. In apparatus of the class described, a supporting frame, a platform scale on the platform on which the said frame is mounted, a horizontally disposed endless conveyer supported on the platform, means for delivering predetermined quantities of material to be weighed to the conveyer, and means to respectively retard and stop motion of the conveyer, the delivery means comprising a downwardly inclined chute terminating at its lower end in discharging relation to the platform, and a gate at said lower end of the chute whereby the amount of material discharging to the platform can be calculated commensurate with motion of said conveyer.

4. In apparatus of the character described, material delivering means, material discharging means, a platform scale, an endless conveyer mounted between the delivery means and said discharge means and supported by the platform of the scale with the ends of the conveyer disposed in operative receiving and discharging positions with respect to the delivery and discharging means, means to regulate the discharge of material from the delivery means to the conveyer, and means to respectively start and stop the conveyer.

JOSEPHINE HANCE REDDICK,
*Widow of John J. Reddick, deceased, and heir at law to the estate of said John J. Reddick.*